United States Patent
Narang et al.

[11] Patent Number: 6,103,426
[45] Date of Patent: Aug. 15, 2000

[54] METAL ION BATTERIES HAVING NON-COMPATIBLE ELECTROLYTES AND METHODS OF FABRICATING SAME

[75] Inventors: Subhash Narang, Palo Alto; Susanna Ventura, Los Altos; Philip Cox, San Jose, all of Calif.

[73] Assignee: SRI International, Menlo Park, Calif.

[21] Appl. No.: 09/140,481

[22] Filed: Aug. 26, 1998

Related U.S. Application Data

[60] Provisional application No. 60/060,452, Sep. 29, 1997.

[51] Int. Cl.⁷ ........................................ H01M 6/16
[52] U.S. Cl. ............................. 429/324; 429/326
[58] Field of Search ..................... 429/126, 326, 429/327, 330, 331, 332, 333, 334, 231.8; 29/623.1

[56] References Cited

U.S. PATENT DOCUMENTS

| | | | |
|---|---|---|---|
| 5,472,809 | 12/1995 | Perton et al. | 429/197 |
| 5,571,635 | 11/1996 | Shu et al. | 429/194 |
| 5,616,429 | 4/1997 | Klementowski | 429/3 |
| 5,626,981 | 5/1997 | Simon et al. | 429/105 |
| 5,643,695 | 7/1997 | Barker et al. | 429/197 |
| 5,910,381 | 6/1999 | Barker et al. | 429/197 |

*Primary Examiner*—Maria Nuzzolillo
*Assistant Examiner*—Mark Ruthkosky
*Attorney, Agent, or Firm*—Fish & Associates; Robert D. Fish

[57] ABSTRACT

Secondary metal ion batteries are fabricated using a working electrolyte that is substantially incompatible with the anode material. This is accomplished by forming an SEI on the anode material at least in part using a compatible (i.e., SEI developing) electrolyte, and including a substantially incompatible (non-SEI forming) composition as the working electrolyte.

23 Claims, 3 Drawing Sheets

METAL ION BATTERIES HAVING NON-COMPATIBLE ELECTROLYTES AND METHODS OF FABRICATING SAME

This application is a U.S. Provisional that claims benefit to Ser. No. 60/060,452 filed Sep. 29, 1997.

FIELD OF THE INVENTION

The field of the invention is rechargeable metal-ion batteries.

BACKGROUND

The continuing electronics revolution has intensified the demand for high energy density rechargeable batteries. To meet this demand, much research has been conducted on metal ion chemistries. Of particular interest in this regard are lithium ion batteries, which typically employ a carbon, metal oxide or metal chalcogenide anode, a lithium salt dissolved in a non-aqueous solvent as the electrolyte, and a lithium metal oxide as the cathode.

Metal ion batteries are usually constructed by separately forming an anode and a cathode, placing an electrolyte between the anode and cathode to form a battery, and then giving the battery an initial charge. Components in the electrolytes used in known metal-ion batteries are sometimes thermodynamically unstable at the electrode potentials employed, and the initial charging of such batteries results in breakdown of such components at the anode. This causes the so-called "first cycle capacity loss" or "irreversible capacity loss". The electrolyte breakdown attending the initial charging cycle occurs significantly at first, but is greatly reduced by the formation of a passivating surface film on the electrode. This passivating surface film is known in the industry as a solid electrolyte interface (SEI).

Formation of the SEI is both advantageous and disadvantageous. On the plus side, timely formation of an SEI reduces the first cycle capacity loss. In commercially available metal ion batteries, for example, first cycle capacity loss is generally limited to less than about 5–10%. In addition, an effective SEI is substantially impermeable to electrolyte, while still being relatively permeable to metal ions. This provides metal ion battery electrolytes with kinetic stability, and results in good cycle life.

On the down side, the need for development of an effective SEI has previously limited the choice of electrolytes. Many known electrolytes having desirable characteristics such as low volatility, high flash point, low freezing point, or high dielectric constant, for example, are unstable on the anodes and fail to produce an effective SEI. Consequently, such electrolytes have previously been used only in relatively low concentrations., (See, e.g., Sony EP 0 696 077, the text of which is incorporated herein by reference).

To a certain extent, development of an effective SEI also limits the choice of anodes. It is known, for example, that propylene carbonate is substantially incompatible with graphite anodes because the graphite catalyzes decomposition of the propylene carbonate, without producing an effective SEI. As a result, propylene carbonate has not heretofore been employed with graphite anodes. 12-Crown-4 has been used as an additive to propylene carbonate to minimize the amount of irreversible capacity during the first intercalation of lithium [see, e.g., "Lithium Batteries—New Materials, Developments and Perspectives", ed. G. Pistoia, Elsevier, 1994), however its use is undesirable because of its known toxicity. Thus, there is a considerable need to develop methods for the development of metal ion batteries that can use electrolytes that are substantially incompatible with the anode material being used.

SUMMARY OF THE INVENTION

The present invention provides secondary metal ion batteries in which the working electrolyte is substantially incompatible with the anode material. This is accomplished by forming a SEI on the anode material at least in part using a substantially compatible (i.e., SEI developing) electrolyte, and including a substantially incompatible (non-SEI forming) composition as the working electrolyte.

All possible combinations of compatible and incompatible electrolytes are contemplated herein. Among other things, it is particularly contemplated that batteries may employ substantially incompatible electrolytes selected from propylene carbonate, triethylphosphate in concentration higher than 15% by volume, ethylene glycol dimethyether, diglyme and so on in combination with graphite anodes All possible methods of forming the SEI are also contemplated, including ex situ and in situ formation. In ex situ formation, chemical functionalization is employed to form an SEI on an anode material, and the resulting anode with SEI is subsequently combined with the working electrolyte and cathode. In in situ formation, the anode material is contacted with a compatible electrolyte, and the combination is deployed with a cathode prior to substantial formation of the SEI.

Various objects, features, aspects and advantages of the present invention will become more apparent from the following detailed description of preferred embodiments of the invention, along with the accompanying drawing in which like numerals represent like components.

DETAILED DESCRIPTION

Figure 1:
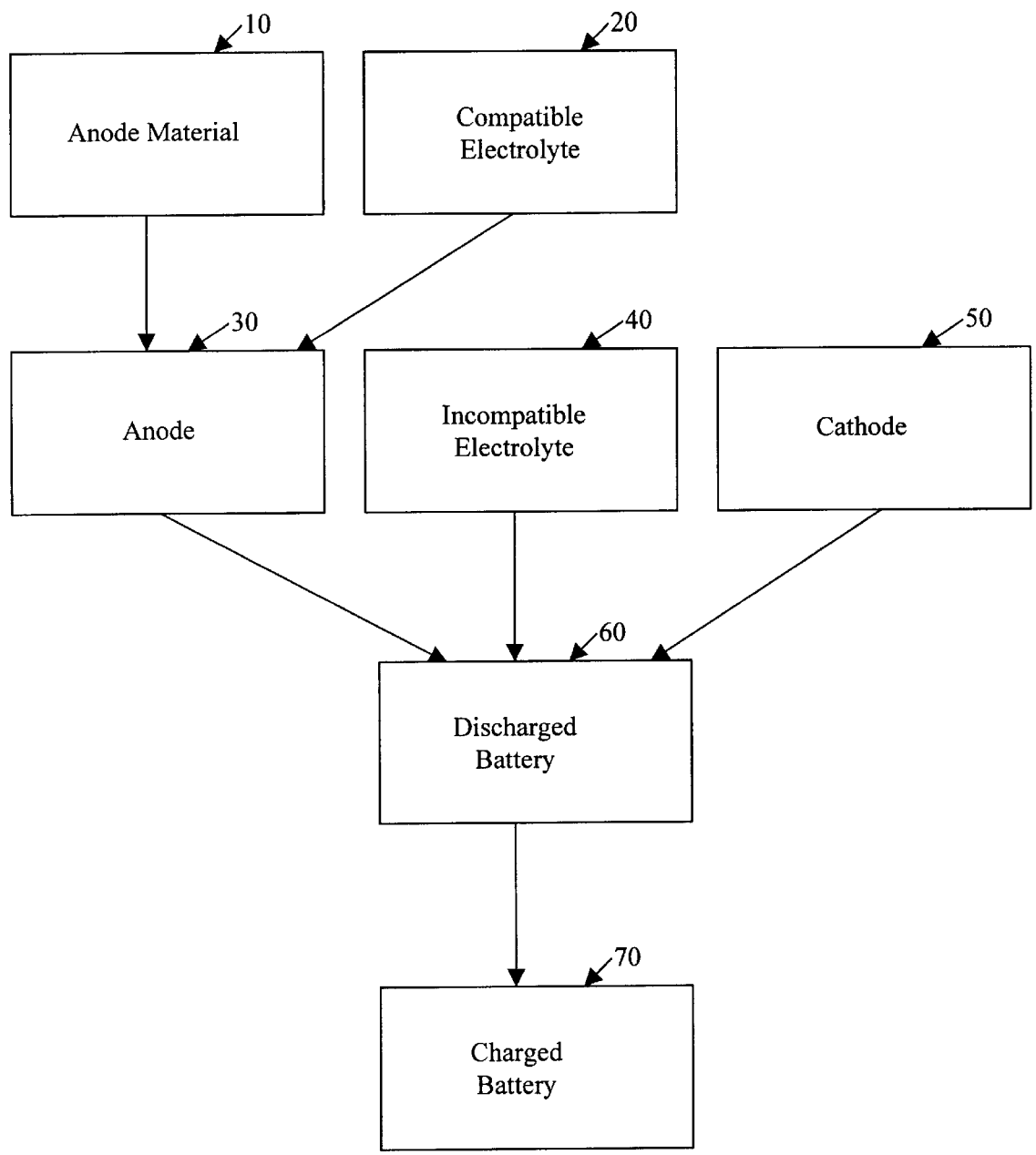
FIG. 1 is a schematic of a class of preferred methods according to the present invention.

The present invention provides rechargeable metal ion batteries having an anode, a cathode, and a working electrolyte operatively coupled to store and release electrical energy, wherein the working electrolyte is substantially incompatible with the anode material. In preferred embodiments this is accomplished by forming an effective SEI on the anode using an electrolyte other than the working electrolyte.

All other aspects of contemplated batteries and battery fabrication methods may be entirely conventional, and any details not specifically related herein are available in the literature. Thus, the size, shape and configuration of contemplated batteries are not particularly critical. In many instances, for example, batteries according to the present invention will have only a single cell, but more commonly such batteries will have multiple cells. Similarly, individual cells may be fabricated into any suitable shape, including flat cells and jelly roll configurations. To avoid possible confusion between a single cell and a battery which may have one or more cells, the terms cell and battery are used interchangeably, except where the context clearly indicates otherwise.

Rechargeable batteries are considered to be those that can be repeatedly charged and discharged, preferably with cycle life of at least 50 cycles. More preferably, rechargeable batteries have expected cycle lives of more than 250 cycles, and more preferably still rechargeable batteries have expected cycle lives of more than 500 or even 1000 cycles.

The particular chemistry involved in contemplated batteries is not critical, although it is contemplated that battery chemistries yielding higher voltages will generally derive greater benefit. For this and other reasons, lithium ion chemistries are generally considered among the metal ion batteries to have the greatest commercial utility and applicability for the present invention, and the following discussion focuses primarily on lithium ion batteries. Nevertheless, it should be understood that appropriate correspondences should be extrapolated to other types of metal ion batteries.

For lithium ion batteries, the anode is preferably fabricated using a material capable of intercalating lithium. Various metal oxides and chalcogenides satisfy this requirement, including especially tin oxide, molybdenum oxide, tungsten oxide, and titanium disulfide. Any suitable form of carbon may alternatively be used for the anode, include coke, synthetic or natural graphite, mesophase microbeads, a soft or hard disordered carbon, and the like. Combinations of anode materials are also contemplated. It is particularly contemplated, however, that the anode material comprises at least 15%, 25%, 50%, 75% or 90% of a compound selected from the group comprising at least one metal oxide, at least one chalcogenide, and at least one form of carbon.

The anode material may advantageously be supported by a current collector. Nickel, copper, stainless steel, and titanium are all suitable current collectors. The anode material may also be bound to the support by a suitable binder, such as fluororesin, polyvinylidene fluoride, ethylene-propylene-diene copolymer, styrene-butadiene rubber, carboxymethylcellulose, and the like. Such binders may be present in any appropriate amount from about 1% to about 20% by weight of the active electrode material, and more preferably from about 5% to about 10% by weight. A conducting filler may also be present with the binder, such as acetylene black or graphite in an amount of from about 1% to about 20% of the weight of the binder and active electrode material and preferably from about 2% to about 5%.

The cathode material is preferably a lithiated metal oxide. Any lithiated metal oxide may be used for this purpose, such as one or more of lithiated nickel oxide, manganese dioxide, or cobalt oxide. The lithiated metal oxide may also be affixed to a support using a suitable binder. Known supports for this purpose are aluminum, aluminum alloys, titanium, stainless steel, and the like. Acetylene black may also be included in the cathode.

In forming the electrodes, the anode and cathode materials are each mixed with a polymeric binder in an appropriate liquid medium such as an organic solvent. This forms a paste or slurry, which is then coated onto a current collector grid, foil or mesh. The resulting intermediates are then pressed into a sheet form, dried and cut to appropriate dimensions.

At some point in the manufacture, a working electrolyte is disposed between the anode and cathode, which electrolyte carries ions in an ion path between the cathode and anode during the life of the battery. Depending on the particular embodiment involved, the working electrolyte can be applied directly to an anode upon which an SEI has already been formed, to both the anode and cathode, or only to the cathode. In still other embodiments the working electrolyte can be used to partially or fully displace a compatible electrolyte previously deployed in the system. Thus, diposing of the working electrolyte in contemplated cells encompasses all suitable methods of appication, including impregnation, coating, wetting, backfilling and filling.

To avoid electrical short circuits, a separator is also generally disposed between the anode and cathode. Separator may comprise any suitable material such as a non-woven cloth of synthetic resin such as polytetrafluoroethylene, polypropylene, or polyethylene, or a woven porous body of such materials, polymer electrolytes and ceramic filled polymer electrolytes, or combinations of multi-layer composites.

Batteries according to the present invention can be used in any manner suitable for rechargeable batteries. Thus, it is contemplated that batteries as described herein will be employed in all manner of portable electronics including computers, cell phones and other portable phones, as well as larger applications such as battery backup systems, and electric and hybrid motor vehicles.

Turning now to FIG. 1, an anode 10 is contacted with a compatible electrolyte 20, and processed to form an an anode 30 having an effective SEI. Anode 30 is then coupled with substantially incompatible electrolyte 40 and cathode 50 to form battery 60. Finally, battery 60 undergoes a first cycle charge to produce charged battery 70.

As used herein the terms "anode material" and "anode" are used interchangeably, except where the context clearly indicates otherwise. Similarly, the terms the terms "cathode material" and "cathode" are used interchangeably. These definitions are intended to eliminate confusion over the exact point at which the respective electrode material(s) is/are incorporated into, and thus becomes an electrode.

Also as used herein, the term "effective SEI" means an interface between an anode and an electrolyte in a metal ion cell that is sufficiently impermeable to the electrolyte and solvent, and sufficiently permeable to the transit of the relevant ions, to provide a cycle life of at least 50 cycles.

The terms "compatible" and "incompatible" are employed herein to refer to the ability of a given electrolyte to form an effective SEI on a particular anode material of interest. Substantially compatible electrolytes with respect to a particular anode material are those which tend to form an effective SEI on that material, while substantially incompatible electrolytes are those which generally fail to form an effective SEI on the anode material and undergo decomposition on the electrode. Where an electrolyte composition contains many electrolyte species, including perhaps multiple solvents, the electrolyte composition is taken as a whole when determining whether or not the electrolyte composition is substantially compatible or substantially incompatible. There are, of course, boundary conditions in which an electrolyte forms an effective SEI with a given anode material either very slowly, or only under special conditions. In such boundary conditions the electrolyte is deemed to be substantially incompatible with the anode material. It should also be understood that the terms "compatible" and "incompatible" are specific to particular anode materials. Propylene carbonate, for example, is substantially compatible with coke anodes, but substantially incompatible with graphite anodes.

There are numerous ways to produce the effective SEI on anode 30. In a preferred embodiment, the anode material comprises graphite or coke, and is processed by adding first n-butyl lithium and then dimethylpyrocarbonate. In an alternative embodiment, the anode material comprises graphite or coke and the SEI is formed by initial addition of n-butyl lithium, followed by di(t-butyldicarbonate).

The substantially incompatible electrolyte 40 employed as the working electrolyte in battery 60, 70 is contemplated to have desirable properties not otherwise readily attained using compatible electrolytes. It is especially desirable, for example, to utilize a working electrolyte that is relatively non-flammable and/or self-extinguishing. Examples are triethylphosphate, 2-ethoxy-1,3,2-dioxaphospholane-2-oxide, perfluoropolyethers, and perfluorocarbonates and so on. Another important class of substantially incompatible electrolytes are those which are readily reduced on graphite at low potentials during charging. Examples of electrolytes in this class are propylene carbonate, ethylene glycol dimethylether, diglyme, triglyme and so on.

By employing a compatible electrolyte 20 to develop the SEI, the working electrolyte 40 can have a decidedly poor SEI compatibility index with respect to the anion material being used. To the best of our knowledge, the term "SEI compatibility index" is employed herein for the first time. The concept is to provide an estimate of the compatibility between a particular anode material and a particular electrolyte in a hypothetical simplified cell, fabricated under normal conditions, and having no other anode material and no other electrolyte. The SEI compatibility index for that particular anode material and electrolyte can then be employed when discussing other cells, such as those containing multiple electrolytes, or cells in which the SEI is formed using another electrolyte.

Numerically, the SEI compatibility index for a particular anode material and a particular electrolyte is the weight percent of metal that is not irreversibly reacted at the anode during an initial charging of the simplified cell to full charge. Thus, assuming that the first charging cycle charges the cell to full charge, then 10% irreversible reaction of lithium at the anode of a lithium ion cell (10% first cycle capacity loss) would correspond to an SEI compatibility index of 90%, while 5% irreversible reaction of lithium (5% first cycle capacity loss) would correspond to an SEI compatibility index of 95%. Of course, the SEI compatibility index is also a function of the cathode(s) employed and therefore the nominal cell voltage involved, but as noted above we are focusing on lithium ion cells, and assume that the cathode for lithium ion batteries comprises a lithiated metal oxide such as lithium cobalt oxide, lithium nickel oxide, or lithium manganese dioxide. Of course, cathodes for determining SEI Compatibility Index for other battery chemistries would thus utilize appropriate materials for the such chemistries.

Another, more practical way of calculating the SEI compatibility index is by calculating the ratio of the charge stored by the battery relative to the charge used to charge the battery on first cycle charging. This can be accomplished by immediate discharging the battery after the first cycle charge. If, for example, the stored charge is 0.9 A and the charge used to charge the battery is 1 A, then the SEI compatibility index is 0.9/1=90%. Of course, to the extent that the cation (or cations) being irreversibly reacted at the anode carries a valence other than +1, the SEI compatibility index calculated by charge ratios will need to be adjusted to correspond with the SEI compatibility index measured by % weight loss.

Using these definitions, it is contemplated that the working electrolyte 40 can have a SEI compatibility index with respect to the anode material being used of 80% or less. Where appropriate, a working electrolyte 40 can be employed that has an even lower SEI compatibility index, such as $\leq 60\%$, $\leq 40\%$, or even approximately zero. It is particularly contemplated that the working electrolyte may comprise at least 15% of at least one compound selected from the group comprising propylene carbonate, triethylphosphate, ethylene glycol dimethylether, diglyme and so on. It is still further contemplated that the working electrolyte may comprise at least 25%, 50%, 75% or 90% of at least one compound selected from the group.

The term "contacting" may also benefit from clarification. As used herein the term "contacting" is employed in the broadest possible sense to mean any method of juxtaposition. Thus, contacting of the anode material 10 with the compatible electrolyte 20 includes all manner of applying the compatible electrolyte 20 to a surface of the anode 10, including brushing, coating, spraying and the like. Contacting also includes dipping the anode 30 in a vat of compatible electrolyte 20. It is also contemplated that contacting includes juxtaposition for longer or shorter periods of time. Contacting even includes mixing, such as where a compatible electrolyte 20 is mixed with particles of the anode material 10 as part of the formation process of anode 30.

Figure 2:
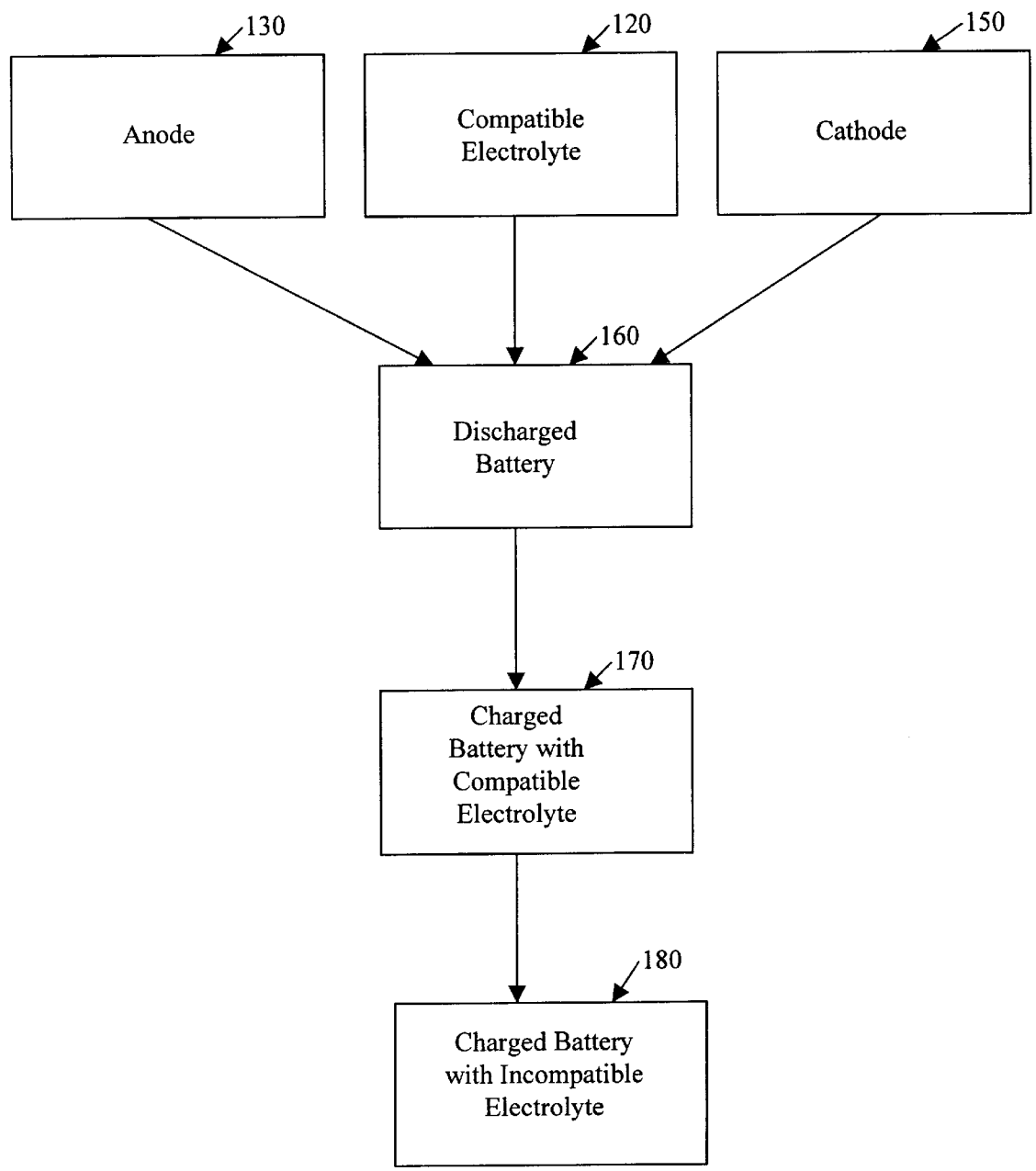
FIG. 2 is a schematic of an alternative class of methods according to the present invention.

In FIG. 2 an alternative embodiment contemplates battery fabrication employing a two step electrolyte filling process. In the first stage, an anode 130, a compatible electrolyte 120, and a cathode 150 are coupled together to produce discharged battery 160. Battery 160 is then charged provided with a first cycle charge to form charged battery, thereby creating an effective SEI. In the second stage charged battery 170 is then presumably discharged for safety, and the substantially compatible electrolyte 120 is replaced in whole or in part with a substantially incompatible electrolyte to form final working battery 180.

In a particularly preferred example, the anode 130 comprises graphite (MCMB 10-28, Osaka Gas Company), and the compatible electrolyte 120 contains ethylene carbonate-dimethylcarbonate. This allows wetting and absorption onto the anode surfaces of the compatible electrolyte components, which can form a stable SEI. It is particularly contemplated that the compatible electrolyte 120 may comprise at least 15%, 25%, 50%, 75% or even 90% of at least one compound selected from the group comprising ethylene carbonate, dimethylcarbonate, ethylmethylcarbonate, ethylpropylcarbonate, and so on.

It is also contemplated that the first filling stage can be performed in a series of sub-steps using a filling vacuum cycling technique to ensure the electrolyte wets the electrodes. In this step, a species which can further enhance the formation of the SEI can be incorporated. Such compounds may advantageously include molecules which generate carbon dioxide, carbon monoxide, sulfur dioxide, sulfur trioxide, nitrogen dioxide, or nitrogen monoxide. Di-butyl dicarbonate may be employed for this purpose, as can dimethylpyrocarbonatenitrites, nitrates, sulfites and so on.

In the second stage, the substantially incompatible electrolyte added will generally have attractive material properties as discussed above. Examples of electrolyte components which could be added in the second stage of the filling procedure include propylene carbonate and diethylcarbonate, triethylphosphate, both materials known to be significantly more reactive than dimethyl carbonate and ethylene carbonate, especially on graphite anodes.

Alternatively, the substantially compatible electrolyte 120 can be replaced in whole or in part with a working electrolyte comprising both a substantially incompatible electrolyte and an additional species which reacts further on the anode to enhance the SEI previously formed. In that case battery 60 can be formation cycled, so that a portion of the SEI is formed using the compatible electrolyte 120, and another portion of the SEI is formed using the additional species. A preferred method of formation cycling limits the first cycle charging capacity to the predicted anode capacity. This method of filling produces batteries with improved capacity compared to a single stage filling procedure using the same working electrolyte.

Figure 3:
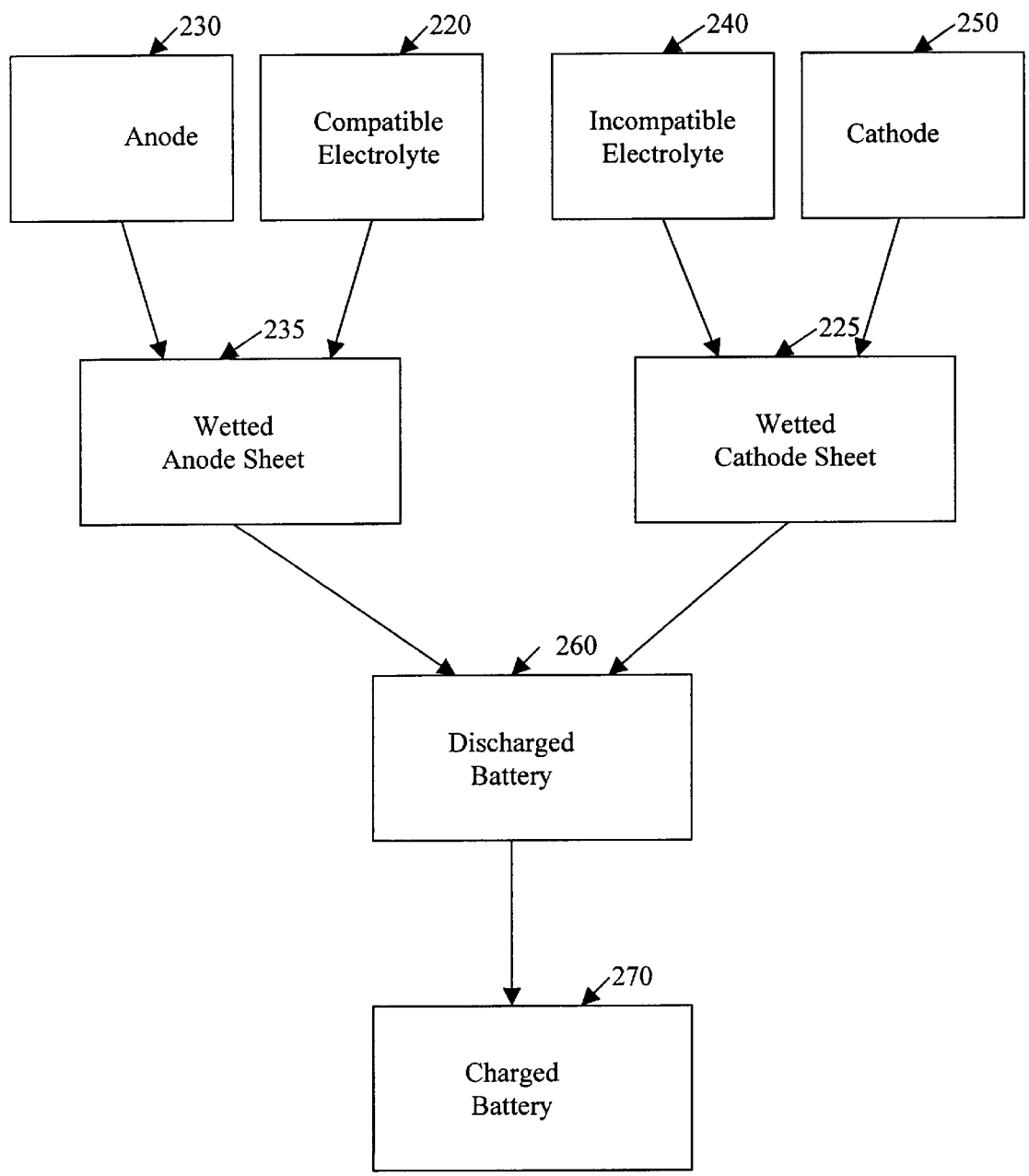
FIG. 3 is a schematic of another alternative class of methods according to the present invention.

In FIG. 3, an anode 230 is contacted with a substantially compatible electrolyte 220 to form wetted anode sheet 235, and a cathode 250 is contacted with a substantially incompatible electrolyte 240 to form wetted cathode sheet 255. The electrolytes 220 and 240 are then sandwiched between the anode 230 and cathode 250. This produces a discharged battery 260, which is then charged to produce charged battery 270.

In this manner the step of forming the SEI may substantially occur subsequent to the step of disposing the electrolyte in the ion path between the anode and cathode. Embodiments according to FIG. 3 are thus relatively easy to construct, and still provide both an effective SEI and the benefits of a properly selected, substantially non-compatible electrolyte.

It should be appreciated, however, that in keeping with the broad interpretation of terms in this application, the methods contemplated in FIG. 3 are species of a broader class of methods in which the electrolytes 220, 240 are somehow inserted between the respective electrodes 230, 250. In other species a separator could be sandwiched between the anode 230 and cathode 250, with the substantially compatible electrolyte 220 previously or subsequently being inserted between the separator and the anode 230, and the substantially incompatible electrolyte 240 previously or subsequently being inserted between the separator and the cathode 250. In other species a polymer electrolyte film containing the substantially compatible electrolyte 220 could be sandwiched between the anode 230 and a polymer electrolyte film containing the substantially incompatible electrolyte could be sandwiched with cathode 250.

Moreover, embodiments according to FIG. 3 can be further enhanced by adding additional steps. For example, in addition to sandwiching a separator between the anode 230 and cathode 250, a third electrolyte can be added to the separator before the sandwiching step.

It is also contemplated that the compatible electrolyte may include at least 10%, 15%, 25% or even more of an incompatible solvent. The comparison here is intended to be a weight percent, as are all other percentages herein not explicitly described otherwise It is also contemplated that at least one of the electrolytes may comprises a polymer, and that the polymer may be present in the battery in multiple (at least two) layers.

Thus, specific embodiments and applications of metal ion batteries having non-compatible electrolytes have been disclosed. It should be apparent, however to those skilled in the art that many more modifications besides those already described are possible without departing from the inventive concepts herein. For example, in embodiments according to FIG. 1 the SEI need not be entirely formed prior to disposing the working electrolyte in the ion path, but may instead be mostly formed at an earlier stage, and continue to be formed after disposing the working electrolyte in the ion path. In that case the step of forming the SEI would only substantially occur prior to the step of after disposing the working electrolyte in the ion path. The inventive subject matter, therefore, is not to be restricted except in the spirit of the appended claims.

We claim:

1. A method of producing a secondary metal ion battery comprising:

providing an anode material; and subsequently forming a SEI on the anode material; and subsequently providing a cathode; and subsequently disposing a working electrolyte in an ion path between the anode material and the cathode, the working electrolyte having an SEI compatibility index with the anode material of less than 80%.

2. The method of claim 1 wherein the step of forming the SEI substantially occurs prior to the step of disposing the working electrolyte in the ion path.

3. The method of claim 2 wherein the step of forming the SEI comprises:

providing a compatible electrolyte having an SEI compatibility index with the anode material of greater than 85%; and contacting the anode material with compatible electrolyte.

4. The method of claim 1 wherein the step of forming the SEI substantially occurs subsequent to the step of disposing the electrolyte in the ion path.

5. The method of claim 4 further comprising:

contacting the anode material with a compatible electrolyte;

contacting the cathode with the working electrolyte; and sandwiching compatible and working electrolytes between the anode material and the cathode.

6. The method of claim 5 further comprising disposing a separator between the anode material and cathode.

7. The method of claim 5 further comprising removing an amount of excess compatible electrolyte from contact with the anode material subsequent to the step of sandwiching.

8. The method of claim 4 further comprising:

contacting the anode material with a compatible electrolyte;

sandwiching compatible electrolyte between the anode and the cathode; and inserting the working electrolyte between the anode and the cathode.

9. The method of claim 8 wherein the step of inserting the working electrolyte comprises displacing at least a portion of compatible electrolyte from between the anode and the cathode.

10. The method of claim 4 further comprising:

sandwiching a separator between the anode material and the cathode;

inserting the working electrolyte between the separator and the cathode; and inserting a compatible electrolyte between the separator and the anode material.

11. The method of any of claims 1–10 wherein the working electrolyte has an SEI compatibility index with the anode material of less than 70%.

12. The method of any of claims 1–10 wherein the working electrolyte has an SEI compatibility index with the anode material of less than 50%.

13. The method of any of claims 1–10 wherein the working electrolyte comprises at least 25% of at least one compound selected from the group consisting essentially of propylene carbonate, triethylphosphate, 2-ethoxy-1,3,2-dioxaphospholane-2-oxide, ethylene glycol dimethylether, diglyme.

14. The method of any of claims 1–10 wherein the working electrolyte comprises at least 50% of at least one compound selected from the group consisting essentially of propylene carbonate, triethylphosphate2-ethoxy-1,3,2-dioxaphospholane-2-oxide, ethylene glycol dimethylether, diglyme.

15. The method of any of claims 1–10 wherein the working electrolyte comprises at least 75% of at least one compound selected from the group consisting essentially of propylene carbonate, triethylphosphate, 2-ethoxy-1,3,2-dioxaphospholane-2-oxide, ethylene glycol dimethylether, diglyme.

16. The method of any of claims 1–10 wherein the working electrolyte comprises at least 90% of at least one compound selected from the group consisting essentially of propylene carbonate, triethylphosphate, 2-ethoxy-1,3,2-dioxaphospholane-2-oxide, ethylene glycol dimethylether, diglyme.

17. The method of any of claims 1–10 wherein compatible electrolyte comprises at least 25% of a compound selected from the group consisting essentially of dimethylcarbonate, ethylene carbonate, methylethylcarbonate, methylpropylcarbonate.

18. The method of any of claims 1–10 wherein compatible electrolyte comprises at least 75% of a compound selected from the group consisting essentially of dimethylcarbonate, ethylene carbonate, methylethylcarbonate, methylpropylcarbonate.

19. The method of any of claims 1–10 wherein the anode material comprises at least 75% of a compound selected from the group consisting essentially of at least one metal oxide, at least one chalcogenide, and at least one form of carbon.

20. The method of any of claims 1–10 wherein the anode material comprises at least 75% coke, graphite, or amorphous carbon.

21. The method of any of claims 1–10 wherein the compatible electrolyte includes at least 15% incompatible solvent.

22. The method of any of claims 1–10 wherein at least one of the electrolytes comprises a polymer.

23. The method of claim 22 wherein the polymer is present in the battery in at least two layers.

* * * * *